United States Patent
Sano

(10) Patent No.: US 10,286,318 B2
(45) Date of Patent: May 14, 2019

(54) COMMUNICATION SYSTEM, METHOD FOR CONTROLLING COMMUNICATION SYSTEM, AND PROGRAM

(71) Applicant: GREE, INC., Tokyo (JP)

(72) Inventor: Takayuki Sano, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 15/585,856

(22) Filed: May 3, 2017

(65) Prior Publication Data

US 2017/0232339 A1    Aug. 17, 2017

Related U.S. Application Data

(63) Continuation of application No. 14/163,414, filed on Jan. 24, 2014, now Pat. No. 9,968,843.

(30) Foreign Application Priority Data

Jan. 31, 2013 (JP) ................ 2013-017917

(51) Int. Cl.
| | |
|---|---|
| A63F 13/5375 | (2014.01) |
| A63F 13/30 | (2014.01) |
| A63F 13/822 | (2014.01) |
| A63F 13/2145 | (2014.01) |
| A63F 13/25 | (2014.01) |

(Continued)

(52) U.S. Cl.
CPC .......... *A63F 13/5375* (2014.09); *A63F 13/12* (2013.01); *A63F 13/2145* (2014.09); *A63F 13/25* (2014.09); *A63F 13/35* (2014.09); *A63F 13/537* (2014.09); *A63F 13/822* (2014.09); *A63F 2300/305* (2013.01); *A63F 2300/6054* (2013.01); *A63F 2300/61* (2013.01); *A63F 2300/807* (2013.01)

(58) Field of Classification Search
CPC ....... A63F 13/005; A63F 13/10; A63F 13/828
See application file for complete search history.

(56) References Cited

U.S. PATENT DOCUMENTS

| | | |
|---|---|---|
| 4,398,720 A | 8/1983 | Jones et al. |
| 5,377,997 A | 1/1995 | Wilden et al. |

(Continued)

FOREIGN PATENT DOCUMENTS

| | | |
|---|---|---|
| EP | 1 427 232 A1 | 6/2004 |
| JP | H09-253329 A | 9/1997 |

(Continued)

OTHER PUBLICATIONS

Aug. 4, 2017 Office Action issued in U.S. Appl. No. 14/163,414.

(Continued)

*Primary Examiner* — Steven J Hylinski
(74) *Attorney, Agent, or Firm* — Oliff PLC

(57) ABSTRACT

In a communication system including a server (1) and a plurality of communication terminals (2) capable of communication with the server (1), based on a variety of parameters indicating the status of a space formed within a game playable by the user of each communication terminal (2) over the communication system, the server (1) transmits advisory information (132), which suggests the next action for the space, to the communication terminal (2). The communication terminal (2) displays a screen including the received advisory information (132).

13 Claims, 8 Drawing Sheets

(51) Int. Cl.
*A63F 13/35* (2014.01)
*A63F 13/537* (2014.01)

(56) References Cited

U.S. PATENT DOCUMENTS

| | | | |
|---|---|---|---|
| 5,678,001 A | 10/1997 | Nagel et al. | |
| 6,609,976 B1 | 8/2003 | Yamagishi et al. | |
| 7,628,697 B2 | 12/2009 | Tanaka | |
| 8,042,045 B1 | 10/2011 | Sullivan et al. | |
| 8,109,820 B2 | 2/2012 | Nagel et al. | |
| 8,353,767 B1* | 1/2013 | Borst | A63F 13/335 463/31 |
| 8,628,414 B2 | 1/2014 | Walker et al. | |
| 8,764,534 B1* | 7/2014 | DeSanti | A63F 13/335 463/31 |
| 8,764,561 B1* | 7/2014 | Lan | A63F 13/12 463/31 |
| 9,259,647 B2 | 2/2016 | Tada et al. | |
| 9,289,681 B2 | 3/2016 | Bromenshenkel et al. | |
| 9,433,855 B1 | 9/2016 | Keeker et al. | |
| 10,019,487 B1* | 7/2018 | Domer | G06F 17/30029 |
| 2002/0025841 A1 | 2/2002 | Nobe et al. | |
| 2003/0216177 A1 | 11/2003 | Aonuma et al. | |
| 2005/0043075 A1 | 2/2005 | Lin et al. | |
| 2006/0100018 A1* | 5/2006 | Ganz | G06Q 30/02 463/42 |
| 2007/0207844 A1 | 9/2007 | Pottinger et al. | |
| 2007/0287518 A1 | 12/2007 | Nagel et al. | |
| 2008/0026804 A1 | 1/2008 | Baray et al. | |
| 2008/0096664 A1 | 4/2008 | Baray et al. | |
| 2010/0075729 A1 | 3/2010 | Allen et al. | |
| 2012/0041907 A1 | 2/2012 | Wang et al. | |
| 2012/0042282 A1* | 2/2012 | Wong | G06F 17/30994 715/811 |
| 2012/0083330 A1 | 4/2012 | Ocko et al. | |
| 2012/0238339 A1 | 9/2012 | Ditton et al. | |
| 2012/0302335 A1 | 11/2012 | Gregory-Brown et al. | |
| 2012/0322556 A1 | 12/2012 | Rogers et al. | |
| 2013/0006736 A1 | 1/2013 | Bethke et al. | |
| 2013/0059634 A1 | 3/2013 | Behmaram-Mosavat et al. | |
| 2013/0212173 A1 | 8/2013 | Carthcart et al. | |
| 2013/0310125 A1 | 11/2013 | Tsiounis | |
| 2014/0155174 A1 | 6/2014 | Laakkonen et al. | |
| 2014/0235338 A1 | 8/2014 | Hansson et al. | |
| 2014/0243079 A1 | 8/2014 | Tsukioka et al. | |
| 2014/0370950 A1 | 12/2014 | Hansson et al. | |
| 2015/0170417 A1 | 6/2015 | Palm et al. | |
| 2016/0296843 A1 | 10/2016 | Stickel | |
| 2017/0200086 A1 | 7/2017 | Margines | |

FOREIGN PATENT DOCUMENTS

| | | |
|---|---|---|
| JP | 2002-312612 A | 10/2002 |
| JP | 2007-244651 A | 9/2007 |
| JP | 2009-100906 A | 5/2009 |
| JP | 2013-587 A | 1/2013 |
| JP | 2013-588 A | 1/2013 |
| WO | 03/019965 A1 | 3/2003 |

OTHER PUBLICATIONS

Jul. 25, 2017 Office Action issued in Japanese Patent Application No. 2016-194373.
Apr. 7, 2015 Decision to Dismiss the Amendment issued in Japanese Patent Application No. 2013/017917.
Apr. 7, 2015 Official Decision of Refusal issued in Japanese Patent Application No. 2013-017917.
Mar. 15, 2016 Office Action issued in Japanese Patent Application No. 2015-126571.
"Dengeki Games" Apr. 1, 2003, p. 139, Media Works Inc.
"Sim City", Wikipedia, Jan. 25, 2013.
Jan. 24, 2017 Office Action issued in Japanese Patent Application No. 2016-194373.
Jan. 21, 2014 Office Action issued in Japanese Patent Application No. 2013-017917.
"Dengeki (Blitz Tactics) Play Station" Nov. 9, 2007, p. 182, vol. 13, issue 39, Media Works Inc.
Orland, Kyle et al. "Cityville for Dummies". Wiley Publishing, Inc., Chapters 1-6, 8, 9, 11, 2011.
4Gamer.net "Cityville Japanese Version Is Released Today". 4Gamer.net, Aug. 4, 2011.
ASCII Media Works Inc. "Dengeki Game Appl". vol. 7, p. 24, Dec. 14, 2012.
Enterbrain, Inc. "Weekly Famitsu". vol. 1225, p. 190, May 24, 2012.
4Gamer.net "Simcity β Test Report". 4Gamer.net, Jan. 30, 2013.
4Gamer.net "Simcity Producer Interview". 4Gamer.net, Dec. 12, 2012.
Enterbrain, Inc. "Simcity DS2 Kanpeki Support Guide". pp. 6, 7, 22, 23, 144, 145, Jun. 19, 2008.
ASCII Media Works Inc. "Weekly ASCII". vol. 889, p. 51, Jul. 10, 2012.
Impress Corporation. "Simcity 4". Game Watch, PC Game Review, Jan. 24, 2003.
Aug. 28, 2018 Office Action issued in Japanese Patent Application No. 2016-194373.
Sim City. Wikipedia, <https://ja.wikipedia.org>, Aug. 30, 2018.
SimCity. Summary of "Let's Conquer SFC Game", <https://www35.atwiki.jp/sfcall/pages/328.html>, Aug. 30, 2018.
Sim City, <http://www.geocities.jp/gurafsander/gamedera.retrogamehonbo.Sim_City.html>, Sep. 3, 2018.
Sim City: Complete Strategy, <http://simcity.cour89.info/basis/mondai.html>, Aug. 30, 2018.
Supercell. First Brief in Case No. H29 YO 22048 of Japanese Patent No. 5823996, Sep. 5, 2017.
Supercell. Second Brief in Case No. H29 YO 22048 of Japanese Patent No. 5823996, Nov. 1, 2017.
Yoshiaki Kudo. "A Report on Operation Check of CityVille" in Case No. H29 YO 22048 of Japanese Patent No. 5823996, Nov. 1, 2017.
Supercell. Second Brief in Case No. H30 YO 22045 of Japanese Patent No. 5823996, Jul. 17, 2018.
Nintendo. "Mario Kart Wii interviewed by the executive head," <https://www.nintendo.co.jp/wii/interview/rmcj/vol1/index5.html> 2014 (printed Jul. 2, 2018).
Nintendo. "List of interviews by the executive head," <https://www.nintendo.co.jp/corporate/links/index.html#wii> 2014 (printed Jul. 2, 2018).
4Gamer.net. "Report on presentation of Nintendo World 2010 of 'Mii Studio' and 'AR Games,'"<www.4gamer.net/games/107/G010761/20110108005/> Jan. 8, 2011.
Game Compass. "2012 Annual Ranking of Game Soft Revenue," <http://gcompass.sp.land.to/rank/2012_genre.html> 2012 (printed Jul. 2, 2018).
Gree. Second Brief in Case No. H30 YO 22045 of Japanese Patent No. 5823996, Aug. 23, 2018.
Nov. 28, 2018 Office Action issued in U.S. Appl. No. 16/131,864.
Nov. 29, 2018 Office Action issued in U.S. Appl. No. 16/131,551.
Crecente, Brian. "A Guide to Building the City(Ville) of Your Dreams". Published Dec. 28, 2010, http://www.nbcnews.com/id/40829499/ns/technology_and_science-games/t/guide-building-cityville-your-dreams.
Feb. 5, 2019 Office Action issued in Japanese Patent Application No. 2016-194373.
4Garrier.net. "Step By Step Guild Wars", https://www.4gamer.net/specials/guildwars_J_beta/03/index.shtml, Jun. 12, 2009.
Arc System Works, "Blazblue Continuum Shift", https://www.jp.playstation.com/software/title/bljm60238.html, Oct. 3, 2016.

* cited by examiner

| User ID | Count of resolved resident concerns | Count of cleared quests | Structure count ||| ... | Friend user ID || ... | Time and date of previous scoring |
| | | | Game center | Bowling alley | Post office | | Friend 1 | Friend 2 | | |
|---|---|---|---|---|---|---|---|---|---|---|
| 1300 | 1301 | 1302 | 1303 | | | | 1304 | | | 1305 |
| UID001 | 28 | 12 | 1 | 0 | 2 | ... | UID101 | UID212 | ... | 2013/1/21 21:32 |
| UID002 | 3 | 0 | 0 | 0 | 0 | ... | UID156 | — | ... | 2013/1/10 16:40 |
| UID003 | 103 | 62 | 3 | 1 | 3 | ... | UID086 | UID543 | ... | 2013/1/30 1:43 |
| ... | ... | ... | ... | ... | ... | ... | ... | ... | ... | ... |

130b

| Type of structure | Name of structure | Income value | Fun value | Convenience value | Beauty value | ... |
|---|---|---|---|---|---|---|
| | | 1306 | 1307 | 1308 | 1309 | |
| Business facility | Game center | 100 | 150 | 0 | 5 | ... |
| | Bowling alley | 60 | 100 | 0 | 10 | ... |
| | Shop | 120 | 50 | 0 | 15 | ... |
| | ... | ... | ... | ... | ... | ... |
| Decorative facility | Art object | 0 | 200 | 0 | 80 | ... |
| | ... | ... | ... | ... | ... | ... |
| Community facility | Post office | 0 | 0 | 100 | 10 | ... |
| | Library | 0 | 0 | 80 | 20 | ... |
| Other | Weeds | 0 | 0 | 0 | −10 | ... |
| | Scrub brush | 0 | 0 | 0 | −25 | ... |
| | Road (straight) | 0 | 0 | 0 | 1 | ... |
| | Road (curved) | 0 | 0 | 0 | 2 | ... |
| | Road (crossroad) | 0 | 0 | 0 | 3 | ... |
| ... | | ... | ... | ... | ... | ... |

COMMUNICATION SYSTEM, METHOD FOR CONTROLLING COMMUNICATION SYSTEM, AND PROGRAM

CROSS-REFERENCE TO RELATED APPLICATION

This application is a continuation of U.S. application Ser. No. 14/163,414 filed Jan. 24, 2014, which is based on and claims priority under 35 U.S.C. 119 from Japanese Patent Application. No. 2013-17917 filed on Jan. 31, 2013, the entire contents of which are incorporated herein by reference.

TECHNICAL FIELD

The present invention relates to a communication system, a method for controlling a communication system, and a program.

BACKGROUND ART

City building simulation games allow users to create a city environment within the game and develop the city. In such city building games, the user installs and develops a variety of facilities and buildings within the game and deals with problems such as earthquakes, environmental pollution, and the like (for example, see "SimCity", Wikipedia (NPL 1)).

CITATION LIST

Non-Patent Literature

NPL 1: "SimCity", Wikipedia. Jan. 25, 2013.

SUMMARY OF INVENTION

Technical Problem

In a conventional city building game, the user has numerous options, and the game has no final objective. Therefore, in order to further develop the city, the user does not always know what action to take next.

Such games include a notification function to prompt the user to respond to cases such as the occurrence of a problem in the city, for example an earthquake. This notification, however, merely indicates the occurrence of a problem and does not contribute to development of the city, which is the objective of the game, even if the user addresses the problem.

Accordingly, the present invention has been conceived in light of the above problems, and it is an object thereof to provide a communication system, a method for controlling a communication system, and a program that can prevent a situation in which the user does not know what to do by advising the user on what action to take next.

Solution to Problem

A communication system according to the present invention for resolving the above problems is a communication system including a server and a plurality of communication terminals capable of communication with the server. Based on a variety of parameters indicating a status of a space formed by a user of each communication terminal within a game playable over the communication system, the server transmits advisory information to the communication terminal, the advisory information suggesting a next action for the space. The communication terminal displays a screen including the advisory information received from the server.

In the communication system according to the present invention, the server may calculate scoring information based on the variety of parameters and transmit the scoring information and the advisory information to the communication terminal, and the communication terminal may display a screen further including content of the scoring information received from the server.

In the communication system according to the present invention, the scoring information may include a ranking based on a comparison with scoring information of other users.

In the communication system according to the present invention, the server may identify an action that the user has not taken based on the variety of parameters and transmit the advisory information to the communication terminal based on a result of identification and on the scoring information.

In the communication system according to the present invention, the variety of parameters may indicate the status of a plurality of spaces for a plurality of users.

A method for controlling a communication system according to the present invention is a method for controlling a communication system including a server and a plurality of communication terminals capable of communication with the server, including transmitting, by the server, based on a variety of parameters indicating a status of a space formed by a user of each communication terminal within a game playable over the communication system, advisory information to the communication terminal, the advisory information suggesting a next action for the space; and displaying, by the communication terminal, a screen including the advisory information received from the server.

The method for controlling a communication system according to the present invention may further include transmitting, by the server, based on scoring information calculated from the variety of parameters, the advisory information and the scoring information to the communication terminal; and displaying, by the communication terminal, a screen further including content of the scoring information received from the server.

In the method for controlling a communication system according to the present invention, the scoring information may include a ranking based on a comparison with scoring information of other users.

In the method for controlling a communication system according to the present invention, the server may identify an action that the user has not taken based on the variety of parameters and transmit the advisory information to the communication terminal based on a result of identification and on the scoring information.

In the method for controlling a communication system according to the present invention, the variety of parameters may indicate the status of a plurality of spaces for a plurality of users.

A non-transitory computer-readable storage medium according to the present invention stores a program which, when executed by a computer functioning as a communication terminal in a communication system comprising a server and a plurality of communication terminals capable of communication with the server, causes the computer to perform operations including: receiving advisory information and scoring information from the server; and displaying a screen including content of the advisory information and the scoring information received from the server.

Advantageous Effect of Invention

The communication system, method for controlling a communication system, and program according to the present invention can prevent a situation in which the user does not know what to do by advising the user on what action to take next.

BRIEF DESCRIPTION OF DRAWINGS

The present invention will be further described below with reference to the accompanying drawings, wherein:

FIG. 2 illustrates users' city information in an embodiment of the present invention;

DESCRIPTION OF EMBODIMENTS

The following describes an embodiment of the present invention.

Embodiment

Figure 1:
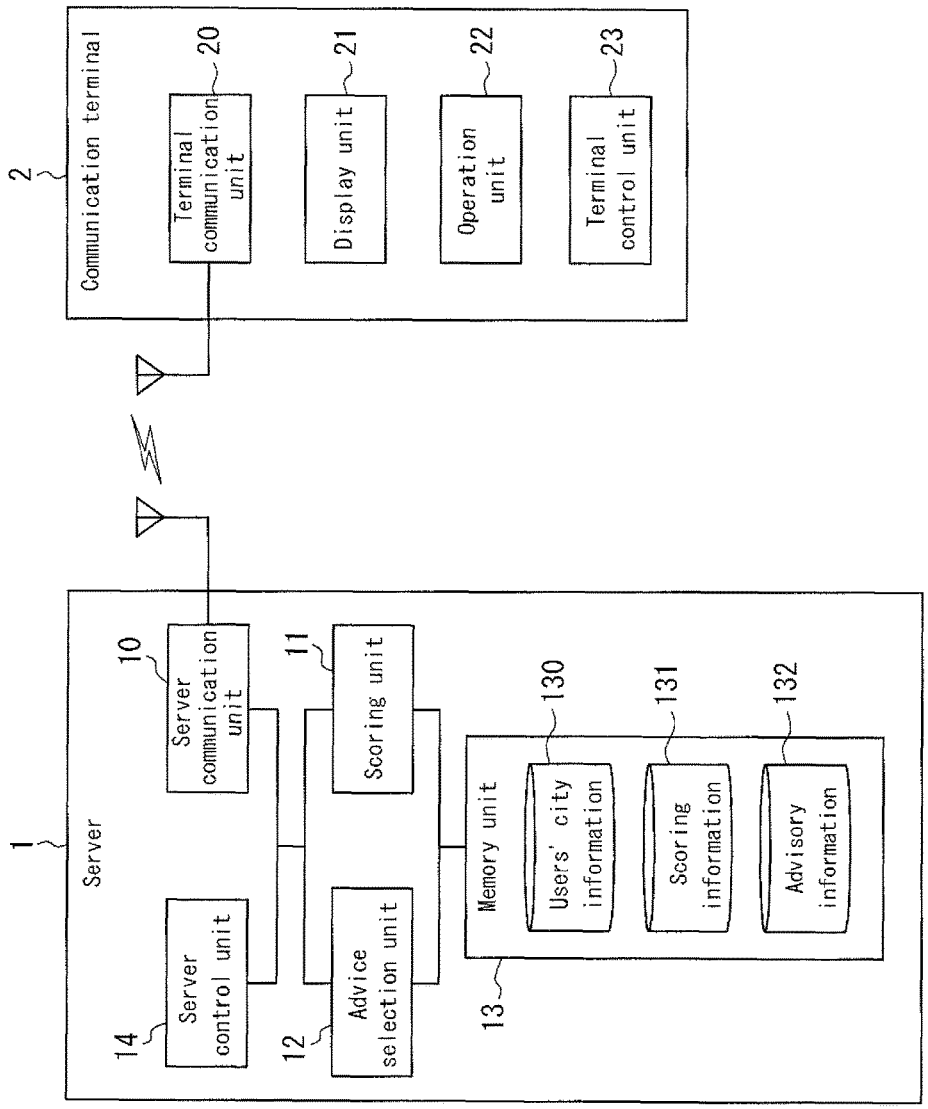
FIG. 1 is a block diagram of a communication system according to an embodiment of the present invention.

FIG. 1 is a block diagram of a communication system according to an embodiment of the present invention. The communication system includes a server 1 and a communication terminal 2. For the sake of simplicity in FIG. 1, only one communication terminal 2 is shown, yet the communication system may include a plurality of communication terminals 2 for a plurality of users.

The server 1 includes a server communication unit 10, a scoring unit 11, an advice selection unit 12, a memory unit 13, and a server control unit 14.

The server communication unit 10 communicates with the communication terminal 2 over a wireless or wired connection.

The scoring unit 11 scores users' city information 130 stored in the memory unit 13 to create scoring information 131. Scoring as used here refers, for example, to calculating a score, for a predetermined area, with a predetermined computation using a plurality of parameters included in the users' city information 130.

With reference to FIG. 2, the users' city information 130 is now described. The users' city information 130 includes information necessary for game progress and user information (users' city information 130a), as well as information on a variety of parameters or the like indicating the status of the user's city (users' city information 130b). In the present embodiment, the users' city information 130a includes information on a user ID 1300 identifying a user, a count 1301 of resolved resident concerns, a count 1302 of cleared quests, and a structure count 1303 of a variety of structures that have been installed in the user's city. The users' city information 130 preferably includes a friend user ID 1304 identifying a friend user, described below, and a time and date 1305 of previous scoring. As parameters related to structures, the users' city information 1306 includes an income value 1306, a fun value 1307, a convenience value 1308, and a beauty value 1309. Specific examples of information used for scoring have been listed, yet the information included in the users' city information 130 is not limited to these examples. For example, the users' city information 130 may include information such as the level or amount of capital of the user's city, the amount of material, the experience points necessary to raise the city's level, or the like.

The count 1301 of resolved resident concerns is the number of requests or the like, from residents of the city in the game, of which notification has been provided and which the user has addressed. The count 1302 of cleared quests is the number of problems (quests), occurring in the game, that the user has resolved.

The structure count 1303 is the number of business facilities, such as a shop, a bowling alley, or the like; decorative facilities such as an art object or the like; community facilities such as a post office; weeds, scrub brush, roads, and the like. For each business facility, the income value 1306 indicating the income for using the facility for one hour, the fun value 1307 indicating how fun the facility is, the beauty value 1309 indicating the beauty of the facility, and the like are determined in advance. For each decorative facility, the fun value 1307, the beauty value 1309, and the like are determined in advance. For each community facility, the convenience value 1308 indicating how convenient the facility is, the beauty value 1309, and the like are determined in advance. For weeds, scrub brush, roads, and the like, the beauty value 1309 and the like are determined in advance. Note that the fun value 1307 of each facility may be undisclosed to the user.

The explanation now returns to FIG. 1. The scoring information 131 is information indicating the result of the scoring unit 11 scoring the users' city information 130 for each predetermined indicator. In the present embodiment, the scoring information 131 includes the score for each of the indicators of "happy", "wealthy", "fun", "beautiful", "convenient", and "balanced", as well as the total of these scores, yet the scoring information 131 is not limited to these values.

The score for "happy" is calculated based on the total of the count 1301 of resolved resident concerns and the count 1302 of cleared quests. The score for "wealthy" is calculated based on the total of the income value 1306 of each business facility. In greater detail, the calculation is performed by multiplying the income value 1306 associated with each business facility by the count 1303 of the corresponding business facility. The score for "fun" is calculated based on the total of the fun value 1307 of each business facility and decorative facility. In greater detail, the calculation is performed by multiplying the fun value 1307 associated with each business facility and decorative facility by the count 1303 of the corresponding business facility or decorative facility. The score for "beautiful" is calculated based on the count 1303 of business facilities, decorative facilities, and weeds/scrub brush, and on the placement of roads. In greater detail, the calculation is performed by multiplying the beauty value 1309 associated with each structure by the corresponding structure count 1303. The score for "convenient" is calculated based on the total of the convenience value 1308 associated with each community facility. In greater detail, the calculation is performed by multiplying the convenience value 1308 associated with each community facility by the count 1303 of the corresponding community facility. The score for "balanced" is calculated based on the variation between the scores of the above five indicators. In greater detail, the standard deviation of each score is subtracted from a predetermined number.

The scoring information 131 preferably further includes overall ranking information and neighborhood ranking information that are based on a comparison with the scoring information 131 pertaining to other users apart from the present user. The overall ranking information indicates the score ranking of the present user among all users playing the game. The neighborhood ranking information indicates the score ranking of the present user among a predetermined user group composed of a plurality of users. This user group is composed, for example, of the present user and other users (friend users) that have performed friend registration mutually with the present user.

Based on the scoring information 131, the advice selection unit 12 selects advisory information 132 that suggests the next action for the city, in greater detail, the advice selection unit 12 determines which indicator has the lowest score based on the scoring information 131 and selects advisory information 132 that specifies the indicator with the lowest score and a measure to take in order to raise the score of the indicator. For example, when the score of the indicator "fun" is the lowest, the facility with the highest fun value 1307 is presented, and the user is encouraged to take the measure installing the facility.

The advice selection unit 12 preferably identifies a facility that the user has not installed based on the users' city information 130 and selects the advisory information 132 based on the result of identification and on the scoring information 131. In greater detail, the advice selection unit 12 selects the advisory information 132 that specifies measure encouraging the user to install the facility with the highest fun value 1307 among the facilities that have not been installed. By thus identifying an action that the user has not yet taken and selecting advisory information 132 based on the result of identification, it is possible to prevent an action that the user has already taken from being shown as the measure, thereby improving the usefulness of the advisory information 132.

The memory unit 13 stores the users' city information 130 and a plurality of sets of advisory information 132 in advance. Due to control by the server control unit 14, the memory unit 13 also stores the scoring information 131 created by the scoring unit 11.

The server control unit 14 performs a variety of control in the server 1. For example, via the server communication unit 10, the server control unit 14 receives a city scoring request by the user and the user ID from the communication terminal 2. By referring to the received user ID and the users' city information 130 stored in the memory unit 13, the server control unit 14 identifies the user pertaining to the scoring request. The server control unit 14 also transmits the scoring information 131 and the advisory information 132 to the communication terminal 2 via the server communication unit 10.

The server control unit 14 determines whether a scoring condition is satisfied for the received scoring request. The scoring condition is, for example, one scoring request per day from the same user. For the second and subsequent scoring request on the same day, the server control unit 14 determines that the scoring condition is not satisfied. In greater detail, the server control unit 14 refers to the users' city information 130 and determines that the scoring condition is not satisfied when one day has not passed since the time and date 1305 of previous scoring. The server control unit 14 also transmits an indication that scoring is not being performed to the communication terminal 2 via the server communication unit 10. The scoring condition is not limited to the above-described condition based on a time constraint and may, for example, be whether a predetermined problem in the game has been resolved.

The communication terminal 2 includes a terminal communication unit 20, a display unit 21, an operation unit 22, and a terminal control unit 23.

The terminal communication unit 20 communicates with the server 1 over a wireless or wired connection.

The display unit 21 displays a variety of screens in a game. The display unit 21 displays a screen based on the scoring information 131 and the advisory information 132 received from the server 1. When an indication that scoring is not being performed is received from the server 1, the display unit 21 also displays that the scoring condition is not satisfied and that scoring is not being performed.

The operation unit 22 is configured with buttons, a touch panel, or the like, receives a user operation for the game, and inputs the operation into the terminal control unit 23. In the explanation below, the operation unit 22 is assumed to be configured with a touch panel.

The terminal control unit 23 performs a variety of control in the communication terminal 2. For example, the terminal control unit 23 transmits a city scoring request and the user ID to the server 1 via the terminal communication unit 20. The terminal control unit 23 also receives the scoring information 131 and the advisory information. 132 from the server 1 via the terminal communication unit 20.

Figure 3:
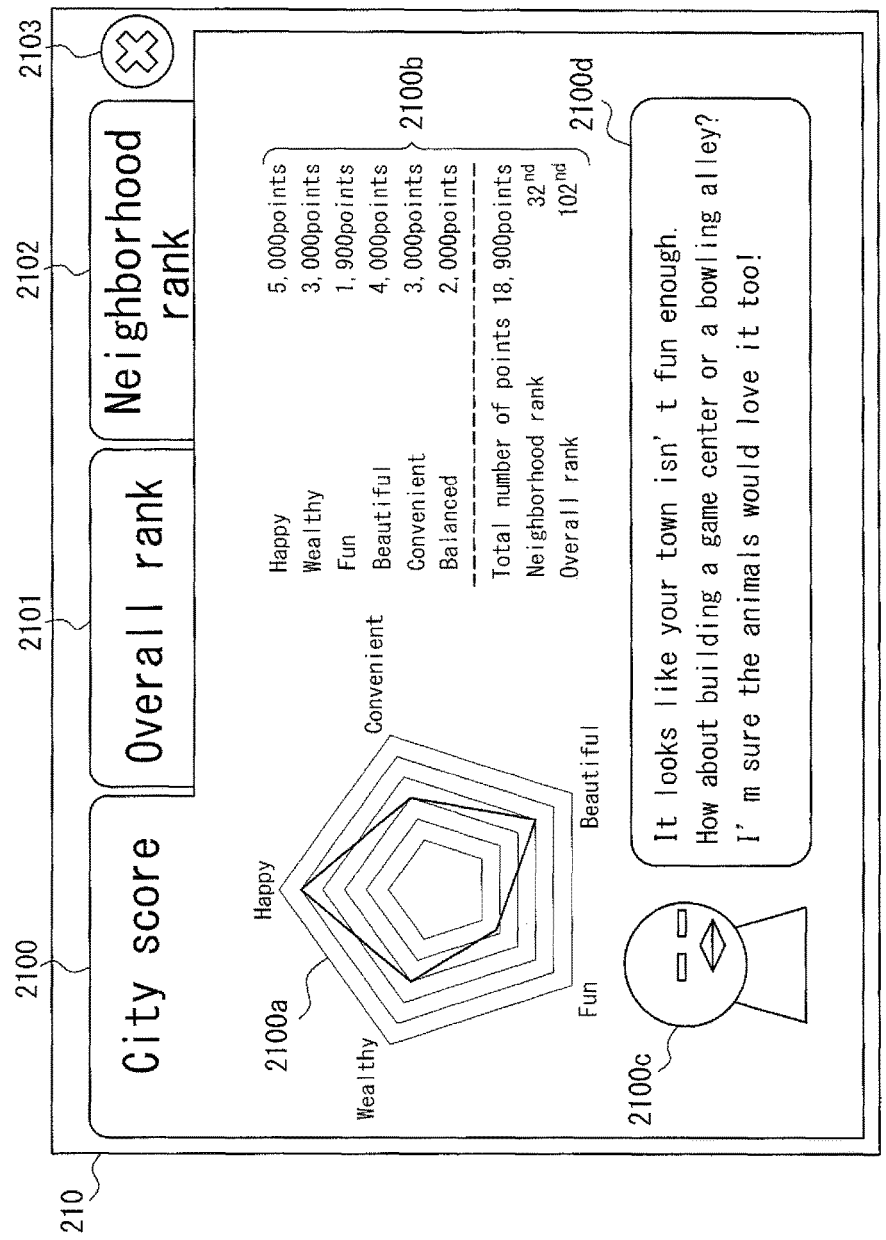
FIG. 3 is an example of a scoring result screen in an embodiment of the present invention.
Figure 4:
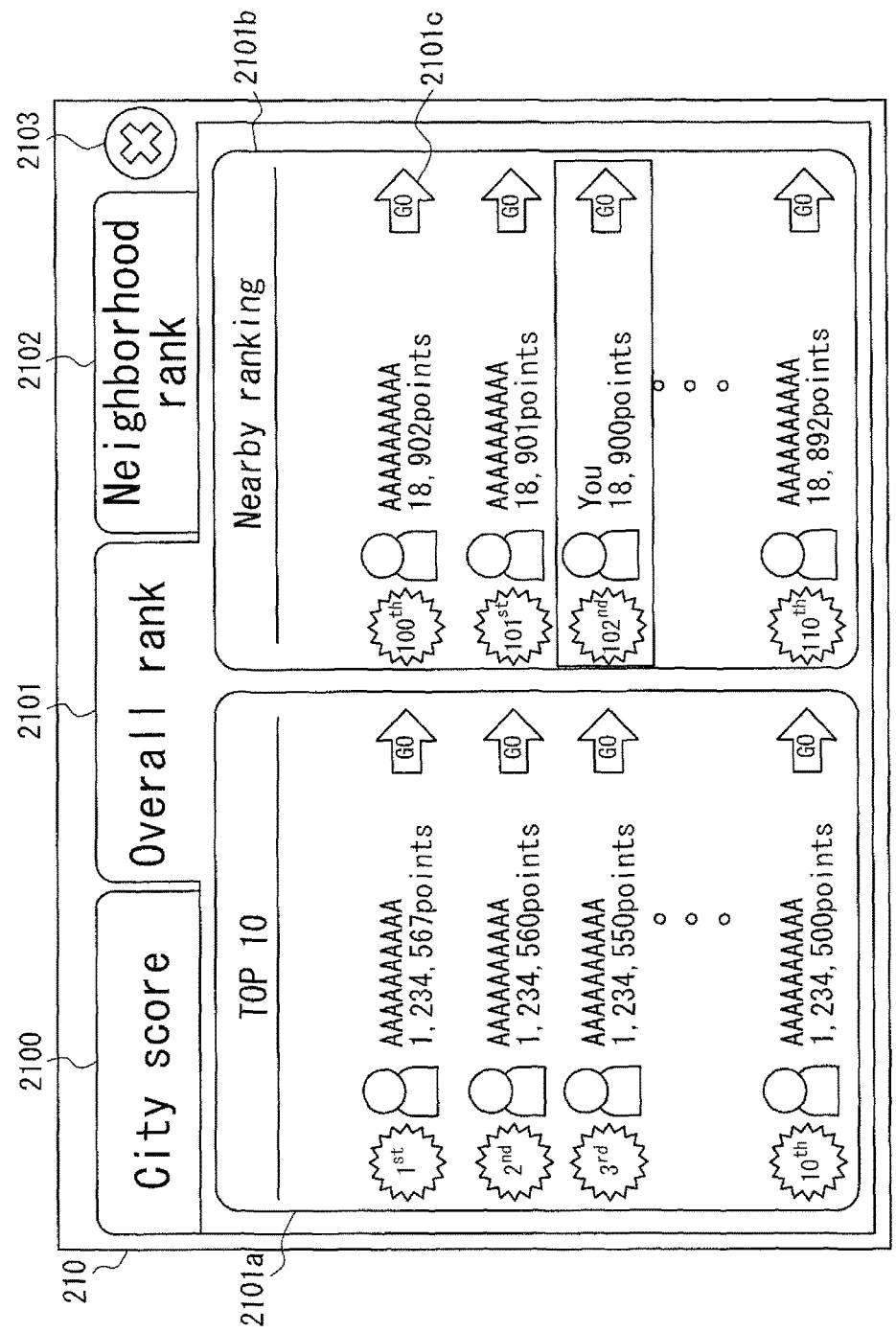
FIG. 4 is an example of a scoring result screen in an embodiment of the present invention.
Figure 5:
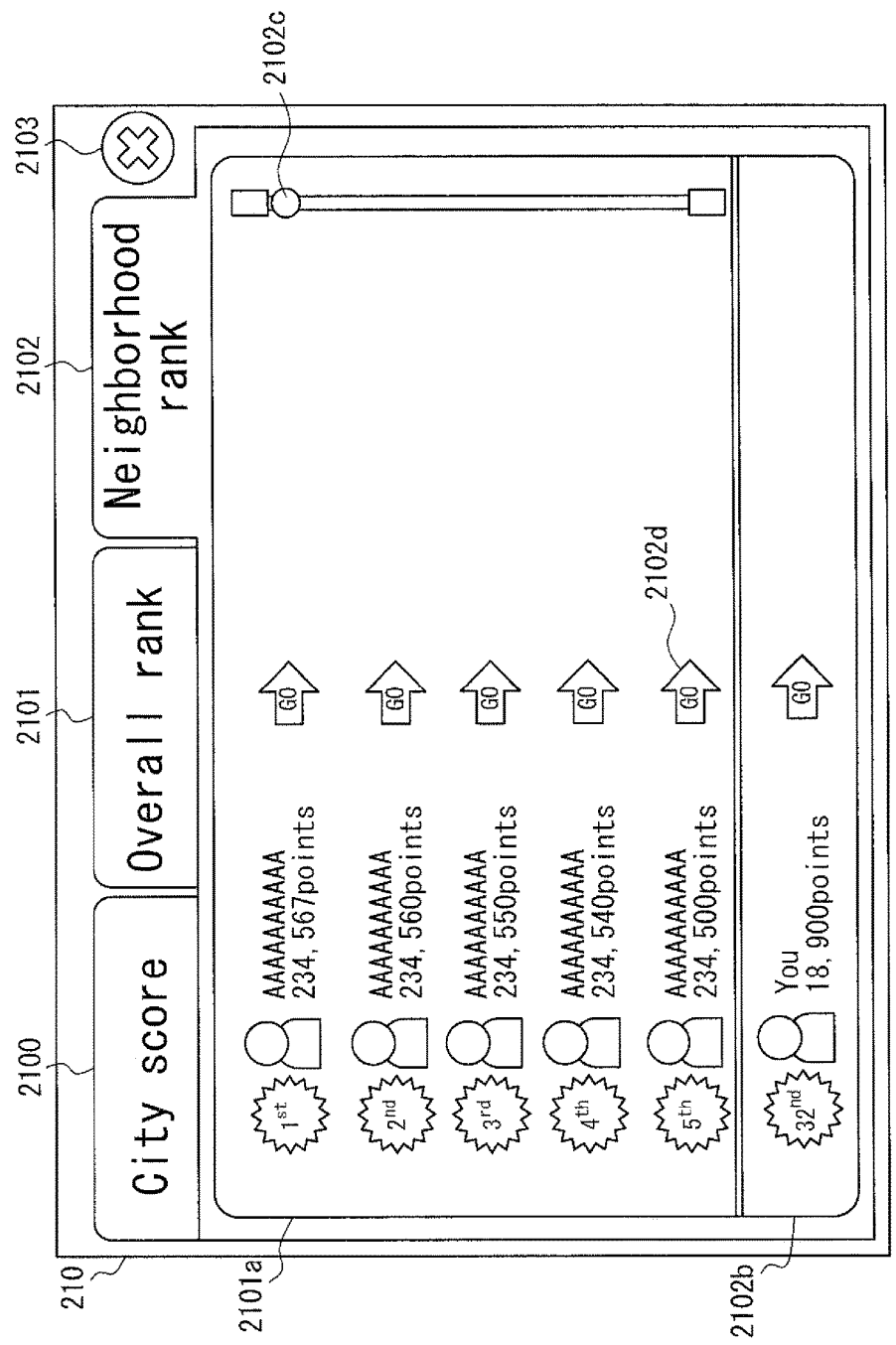
FIG. 5 is an example of a scoring result screen in an embodiment of the present invention.

With reference to FIGS. 3, 4, and 5, a scoring result screen 210 displayed on the display unit 21 of the communication terminal 2 in an embodiment of the present invention is described. The scoring result screen 210 includes a city score tab 2100, an overall rank tab 2101, a neighborhood rank tab 2102, and a close button 2103.

The city score tab 2100, the overall rank tab 2101, and the neighborhood rank tab 2102 form an input interface to receive user input for switching the content of the scoring result screen 210. When the user selects one of these tabs by tapping it, the content corresponding to the tab is displayed on the scoring result screen 210.

The close button 2103 is an input interface to receive user input for closing the scoring result screen 210 that is being displayed. When the user taps the close button 2103, the scoring result screen 210 closes, and display of the display unit 21 switches, for example, to a main menu screen 211 illustrated in FIG. 7.

FIG. 3 is an example of the scoring result screen 210 when the city score tab 2100 is selected. The scoring result screen 210 includes a score graph 2100a, a scoring result 2100b, a character 2100c, and a comment section 2100d.

The score graph 2100a is an image of a radar chart visually representing the score of each indicator in the scoring information 131 received from the server 1. In the radar chart, the "balanced" indicator is not represented. Note that the score graph 2100a is not limited to the above-described radar chart, but may also, for example, be an image of a bar graph, a line graph, or the like.

Based on the scoring information 131 received from the server 1, the scoring result 2100b numerically represents the score of each indicator, the total number of points, which is the sum of the scores, and the neighborhood rank and overall rank for the total number of points.

The character 2100c is an image of a character that presents the information displayed in the comment section 2100d to the user. The comment section 2100d displays information based on the advisory information 132 received from the server 1. Specifically, in FIG. 3, the comment section 2100d displays that the indicator with the lowest score is "fun" and that the measure of installing a game center or bowling alley should be taken.

FIG. 4 is an example of the scoring result screen 210 when the overall rank tab 2101 is selected. The scoring result screen 210 includes a top display portion 2101a, a nearby display portion 2101b, and a city visit button 2101c.

The top display portion 2101a is a ranking, among all users, of the total score based on the scoring information 131 and displays the total score and rank for the top ten users.

The nearby display portion 2101b is a ranking of the total score based on the scoring information 131 and displays the total score and rank of the present user ("You" in FIG. 4) and other nearby users.

The city visit button 2101c is an input interface to receive user input for displaying the corresponding user's city. The city visit button 2101c is displayed in correspondence with each user displayed on the scoring result screen 210. When the user taps the city visit button 2101c, display of the display unit 21 switches to a screen displaying the corresponding user's city.

FIG. 5 is an example of the scoring result screen 210 when the neighborhood rank tab 2102 is selected. The scoring result screen 210 includes a friend display portion 2102a, a user display portion 2102b, a scrollbar 2102c, and a city visit button 2102d. Since the city visit button 2102d has the same structure as the city visit button 2101c in FIG. 4, a description thereof is omitted.

The friend display portion 2102a is a ranking, among the user group of friend users, of the total score based on the scoring information 131 and displays the total score and rank for each friend user. When the user swipes the friend display portion 2102a or slides the scrollbar 2102c, display of the total score and rank of all of the friend users is scrolled.

The user display portion 2102b displays the total score and the rank of the present user among the friend users.

In FIGS. 4 and 5, an image visually displaying the present user's rank, such as a distribution map or the like, may be further displayed.

Figure 6:
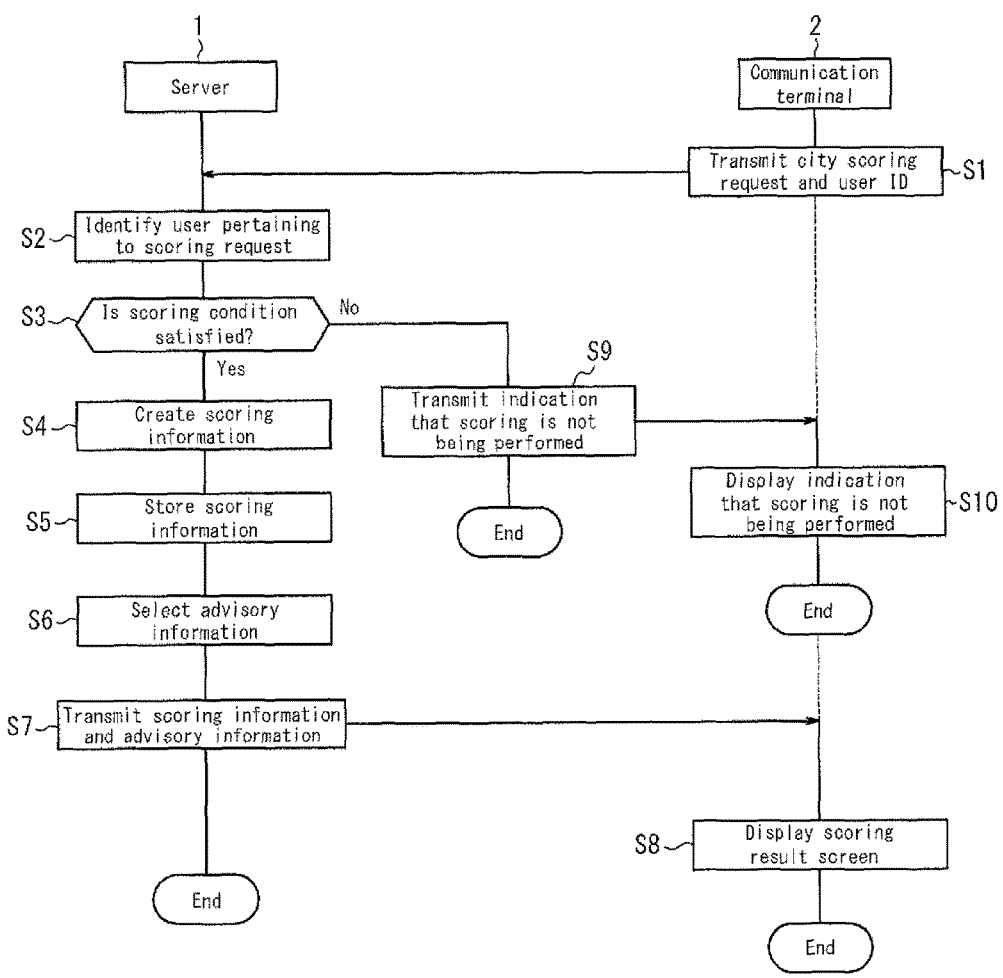
FIG. 6 is a flowchart illustrating operations by the communication system according to an embodiment of the present invention.

With reference to FIG. 6, operations by the communication system according to an embodiment of the present invention are now described.

First, the terminal control unit 23 of the communication terminal 2 transmits a city scoring request and the user ID to the server 1 via the terminal communication unit 20 (step S1).

Next, by referring to the received user ID and the users' city information 130 stored in the memory unit 13, the server control unit 14 of the server 1 identifies the user pertaining to the scoring request (step S2).

The server control unit 14 then determines whether a scoring condition is satisfied for the received scoring request (step S3). When the scoring condition is determined to be satisfied in step S3 (step S3: Yes), processing proceeds to step S4. On the other hand, when the scoring condition is determined not to be satisfied in step S3 (step S3: No), processing proceeds to step S9.

When the scoring condition is determined to be satisfied in step S3, the scoring unit 11 scores the users' city information 130 stored in the memory unit 13 to create scoring information 131 (step S4).

Next, the server control unit 14 stores the scoring information 131 created by the scoring unit 11 in the memory unit 13 (step S5).

Next, based on the scoring information 131, the advice selection unit 12 selects advisory information 132 (step S6). The advice selection unit 12 preferably identifies a facility that the user has not installed based on the users' city information 130 and selects the advisory information 132 based on the result of identification and on the scoring information 131.

Next, the server control unit 14 transmits the scoring information 131 and the advisory information 132 to the communication terminal 2 via the server communication unit 10 (step S7).

Next, the display unit 21 of the communication terminal 2 displays the scoring result screen 210 based on the scoring information 131 and the advisory information 132 received from the server 1 (step S8).

On the other hand, when the scoring condition is determined not to be satisfied in step S3, the server control unit 14 transmits an indication that scoring is not being performed to the communication terminal 2 via the server communication unit 10 (step S9).

Next, the display unit 21 of the communication terminal 2 displays the indication that the scoring condition is not satisfied and that scoring is not being performed (step S10).

Figure 7:
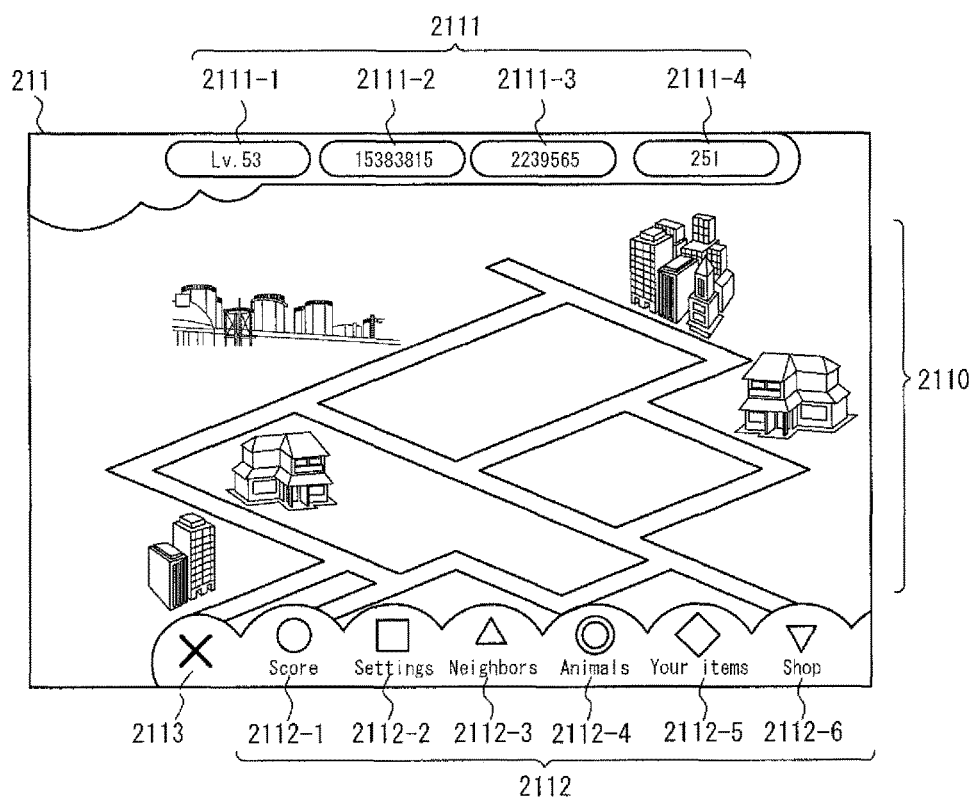
FIG. 7 is an example of a main menu screen in an embodiment of the present invention.

FIG. 7 is an example of the main menu screen 211 displayed on the display unit 21 of the communication terminal 2. The main menu screen 211 includes a city display portion 2110, a parameter display portion 2111, menu icons 2112, and a close button 2113.

The city display portion 2110 displays an image showing the appearance of the user's city.

The parameter display portion 2111 displays predetermined parameters based on the users' city information 130. For example, parameter display portion 2111-1 displays the city's level. Parameter display portion 2111-2 displays the amount of capital in the city. Parameter display portion 2111-3 displays the amount of material in the city. Parameter display portion 2111-4 displays the experience points necessary to raise the city's level.

The menu icons 2112 are an input interface to receive user input for switching between screens displaying predetermined information corresponding to the icons. When the user taps one of the menu icons 2112, display of the display unit 21 switches to the screen displaying information corresponding to the tapped menu icon 2112. For example, when the user taps menu icon 2112-1, display of the display unit 21 switches to the scoring result screen 210. When the user taps menu icon 2112-3, display of the display unit 21 switches to a friend list screen 212, described below.

The close button 2113 is an input interface to receive user input for hiding display of the menu icons 2112 that are being displayed. When the user taps the close button 2113, display of the menu icons 2112 and the close button 2113 is hidden.

Figure 8:
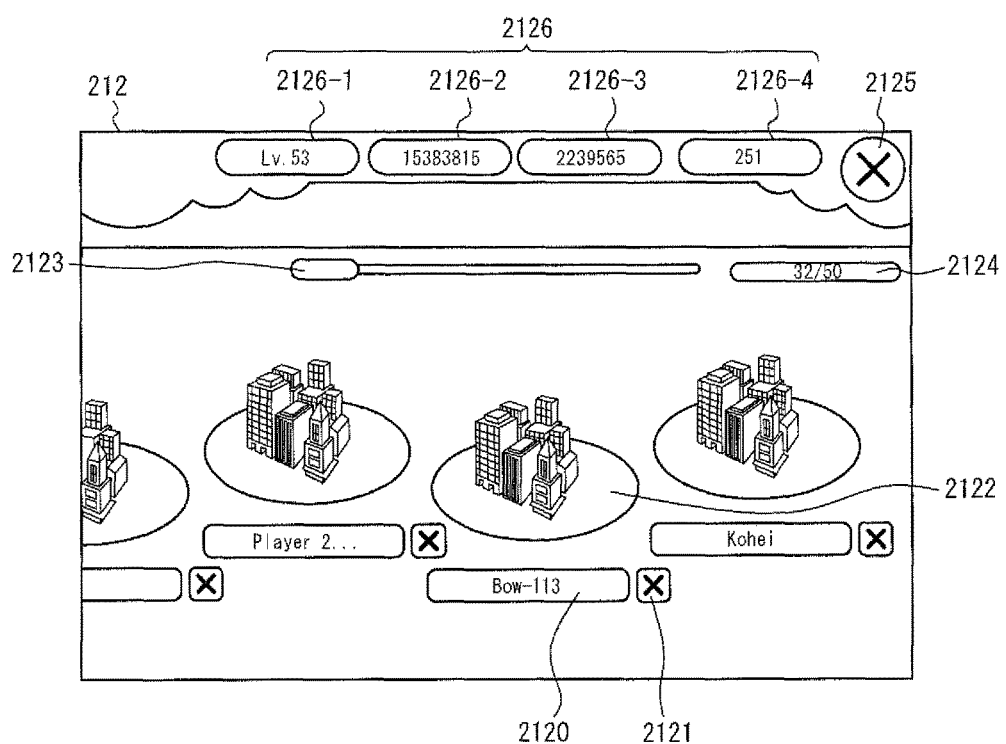
FIG. 8 is an example of a friend list screen in an embodiment of the present invention.

FIG. 8 is an example of the friend list screen 212 displayed on the display unit 21 of the communication terminal 2. The friend list screen 212 displays a list of friend users that are targeted for neighborhood ranking. The friend list screen 212 includes friends' name display portions 2120, delete friend buttons 2121, friends' city icons 2122, a scrollbar 2123, a friend count display portion 2124, a close button 2125, and a parameter display portion 2126. Since the parameter display portion 2126 has the same structure as the parameter display portion 2111 in FIG. 7, a description thereof is omitted.

The friends' name display portion 2120 displays the names of friend users in the game. The delete friend button 2121 is an input interface to receive user input for canceling the friend registration of the corresponding friend user. The friends' city icon 2122 is an image showing the appearance of the corresponding friend user's city. When the user swipes the friend list screen 212 or slides the scroll bar 2123, display of all of the friend users is scrolled.

The friend count display portion 2124 displays the number of friend users that the user has registered and the upper limit on the number of friend users that can be registered.

The close button 2125 is an input interface to receive user input for closing the friend list screen 212 that is being displayed. When the user taps the close button 2125, the friend list screen 212 closes, and display of the display unit 21 switches, for example, to the main menu screen 211.

In the communication system according to the present invention, the server 1 thus scores the user-created city for a predetermined area and advises the user on the next action for the city, whereby the user can learn of an effective action for developing the city. Since the user can repeatedly receive advice from the server 1 and further develop the city, the user's interest in the game can be maintained. Furthermore, by scoring the cities of other users and presenting a city ranking that shows a comparison with other users, the user can be motivated to develop the city in order to improve the ranking. By using the ranking display as an opportunity for making the display of other users' cities possible, the user can also refer to how other users build their cities.

Modification

The following describes a modification of the present invention. In the above-described embodiment, the server 1 scores the users' city information 130 of the present user to create one set of scoring information 131, yet in this modification, the server 1 scores a plurality of sets of users' city information 130 pertaining to a plurality of users to create one set of scoring information 131. The plurality of users is, for example, a user group composed of a user and the user's friend users. With this approach, in cases such as when a single user's city and the cities of the user's friend users are integrated into one large city, the server 1 can score the large city and offer advice.

Furthermore, in this modification, the advice selection unit 12 identifies a facility that no user has installed based on the plurality of sets of users' city information 130 and selects the advisory information 132 based on the result of identification and on the scoring information 131. With this approach, an action that none of the users has taken can be presented as a measure to take, thereby improving the usefulness of the advisory information 132.

According to the communication system of the modification to the embodiment, a plurality of users forming a user group can be newly motivated to cooperate in developing their cities.

Although the present invention has been described based on the drawings and embodiment, it should be noted that various changes and modifications will be apparent to those skilled in the art based on the present disclosure. Therefore, such changes and modifications are to be understood as included within the scope of the present invention.

For example, in the above-described embodiment, the advice selection unit 12 determines which indicator has the lowest score based on the scoring information 131 and selects advisory information 132 that specifies the indicator with the lowest score and a measure to take in order to raise the score of the indicator, yet the present invention is not limited in this way. For example, the advice selection unit 12 may determine which indicator has the highest score based on the content of the indicators in the scoring information 131 and select advisory information 132 that specifies the indicator with the highest score and a measure to take in order to lower the score of the indicator. Furthermore, during a limited-time event or the like in the game, a new indicator for completion of an event objective may be established, and specification of a measure for increasing the score of this indicator may be prioritized.

In the above-described embodiment, an example of a city building simulation game was described, yet the present invention is not limited in this way. Instead of a city, the space that the user forms within the game may be any space within the game, such as a country, region, garden, ranch, farm, store, or the like.

REFERENCE SIGNS LIST

1: Server
2: Communication terminal
10: Server communication unit
11: Scoring unit
12: Advice selection unit
13: Memory unit
14: Server control unit
20: Terminal communication unit
21: Display unit
22: Operation unit
23: Terminal control unit
130 (130a, 130b): Users' city information.
131: Scoring information
132: Advisory information
210: Scoring result screen
211: Main menu screen
212: Friend list screen
1300: User ID
1301: Count of resolved resident concerns
1302: Count of cleared quests
1303: Structure count
1304: Friend user ID
1305: Time and date of previous scoring
1306: Income value
1307: Fun value
1308: Convenience value
1309: Beauty value
2100: City score tab
2101: Overall rank tab
2102: Neighborhood rank tab
2103: Close button
2100a: Score graph
2100b: Scoring result
2100c: Character
2100d: Comment section
2101a: Top display portion.
2101b: Nearby display portion
2101c: City visit button
2102a: Friend display portion
2102b: User display portion
2102c: Scrollbar
2102d: City visit button
2110: City display portion
2111: Parameter display portion
2112: Menu icon
2113: Close button
2120: Friends' name display portion 2121: Delete friend button
2122: Friends' city icon
2123: Scrollbar
2124: Friend count display portion
2125: Close button
2126: Parameter display portion

The invention claimed is:

1. A server comprising:
a communication unit configured to communicate with a plurality of communication terminals for a plurality of users;
a memory configured to store a plurality of numerical parameters related to a virtual space in a game for each user; and
a controller configured to
identify, based on at least two numerical parameters of the plurality of numerical parameters related to a first virtual space of a first user, an object which has not been installed in the first virtual space, and
transmit information related to the identified object to a first communication terminal of the first user.

2. The server of claim 1, wherein
the at least two numerical parameters related to the first virtual space include at least two parameters related to one or more objects for being installed in the first virtual space, and
the information related to the object includes information encouraging installation of the object.

3. The server of claim 1, wherein
the controller is configured to
cause one or more input interfaces corresponding to one or more second users respectively to be displayed on the first communication terminal, and
cause, in response to user input received by the input interface among the one or more input interfaces, a second virtual space of the second user corresponding to the input interface to be displayed on the first communication terminal.

4. The server of claim 1, wherein
the controller is configured to cause an icon representing a second virtual space of a second user to be displayed on the first communication terminal.

5. The server of claim 1, wherein
the controller is configured to
determine a result of a predetermined computation using the plurality of numerical parameters, and
cause a screen based on the result of the predetermined computation to be displayed on the first communication terminal.

6. The server of claim 1, wherein
the object identified is a building.

7. A method executed by a computer functioning as a server configured to communicate with a plurality of communication terminals for a plurality of users, the method comprising:
storing a plurality of numerical parameters related to a virtual space in a game for each user;
identifying, based on at least two numerical parameters of the plurality of numerical parameters related to a first virtual space of a first user, an object which has not been installed in the first virtual space; and
transmitting information related to the identified object to a first communication terminal of the first user.

8. The method of claim 7, wherein
the object identified is a building.

9. One or more non-transitory computer readable media including computer program instructions which, when executed by a computer functioning as a communication terminal, cause the computer to:
store a plurality of numerical parameters related to a first virtual space of a first user in a game;
identify, based on at least two numerical parameters of the plurality of numerical parameters, an object which has not been installed in the first virtual space; and
display information related to the identified object.

10. The one or more non-transitory computer readable media of claim 9, wherein
the at least two numerical parameters related to the first virtual space include at least two parameters related to one or more objects for being installed in the first virtual space, and
the information related to the object includes information encouraging installation of the object.

11. The one or more non-transitory computer readable media of claim 9, wherein the computer program instructions further cause the computer to:
display one or more input interfaces corresponding to one or more second users respectively, and
display, in response to user input received by the input interface among the one or more input interfaces, a second virtual space of the second user corresponding to the input interface.

12. The one or more non-transitory computer readable media of claim 9, wherein the computer program instructions further cause the computer to display an icon representing a second virtual space of a second user.

13. The one or more non-transitory computer readable media of claim 9, wherein
the object identified is a building.

* * * * *